United States Patent [19]

Pascale

[11] 4,066,555

[45] Jan. 3, 1978

[54] ROTARY FILTER

[76] Inventor: Joseph Andrew Pascale, 41 Longmeadow, Pine Bluff, Ark. 71603

[21] Appl. No.: 684,068

[22] Filed: May 6, 1976

[51] Int. Cl.² .............................................. B01D 33/06
[52] U.S. Cl. .................................... 210/402; 210/217; 210/258; 210/326; 210/497 R
[58] Field of Search ............... 210/402, 258, 217, 326, 210/497

[56] References Cited
U.S. PATENT DOCUMENTS

| 2,987,191 | 6/1961 | Wennberg | 210/402 X |
| 3,773,614 | 11/1973 | Pennington | 210/402 X |
| 3,919,088 | 11/1975 | Doncer et al. | 210/402 |

Primary Examiner—R.E. Serwin
Attorney, Agent, or Firm—Joseph A. Strode

[57] ABSTRACT

An improved rotary filter is cylindrical in shape, and operates by vacuum suction or otherwise to withdraw fluids from a substance exposed to the outer area of the device, drawing said fluids into the filter to be pumped out to a suitable reservoir. It includes an inner cylindrical surface having attached thereon a plurality of selectively spaced support structures which extend longitudinally along the inner cylinder. Said support structures are covered with a plastic covering adapted to receive a filtering medium which forms the outer circumference of the rotary filter. In one embodiment the plastic covers are grooved to receive a spirally wound wire to further support said filtering medium.

12 Claims, 5 Drawing Figures

ROTARY FILTER

BACKGROUND OF THE INVENTION

1. Field of the Invention

This invention relates generally to filtering devices, and more particularly to a rotary type of filtering device which is of the general type employed in the pulp and paper industry.

2. Description of the Prior Art

For years rotary filter devices have been used in various applications, notably in the pulp and paper industry. Such devices are cylindrical in shape and have been constructed of metallic substances, typically stainless steel, or other metal clad with stainless steel. An outer surface is composed of a filtering medium, typically a mesh composed of metal or plastic. Vacuum or other suction forces applied from within the filter cause the substance being filtered, for example, pulp saturated with water, chemicals, or various fluids, to adhere to the filter medium and draw the fluids out of the pulp. The pulp is then removed as the filter nears completion of a rotation cycle, typically by means of a scraping device selectively positioned with respect to the filter surface, or by application of air pressure. Rotation rate of the filter is set to match filter diameter, pulp concentration, and other variables such that the desired degree of filtration is achieved by the time the filter nears completion of one rotation cycle. The filter is positioned so that the lower part thereof dips into a container of the saturated pulp. Thus the filtering process is a continuous process, with the filtered pulp being removed from the filter just before the filter surface rotates back through the container, and as it rotates through the container suction forces cause the saturated pulp to adhere to the outer surface and repeat the cycle.

Prior art devices have generally consisted of an inner cylindrical surface having a plurality of support structures which extend radially outward from the cylinder surface, and extend longitudinally across the entire length of the inner surface. The support structures are grooved or notched to receive a spirally wound wire continuously wrapped around them. These winding wires form a partial surface to support the filtering medium. In prior art devices the support structures and winding wire have consisted of a metallic substance, typically stainless steel. The device is then covered with a pliable mesh filtering medium, which forms the outer surface of the filter.

Although many problems exist in connection with use of such a prior art device, these devices have been used without substantial change or improvement for more than twenty years. In use, the various exposed surfaces of the filter are in continuous contact with various corrosive substances, such as chlorides, which cause all the exposed metallic surfaces to corrode. These filtering devices are typically of enormous size, such as ten feet or more in diameter, and represent a substantial capital investment, typically a few hundred thousand dollars. Yet when used in a corrosive environment, repairs and modifications are frequently necessitated, which require shutting down the paper machine, or other process, for significant periods of time. Each time the machine is shut down it means a loss of many thousands of dollars, and the greater the length of time the machine is down the more the loss.

In typical use, within a few years it will be necessary to refinish the filter, because of corrosion. The grooves in the winding wire support structures will have corroded to the point that they have been virtually eaten away, and no longer furnish a firm support for the winding wires. The winding wires are then free to move and slide about, making it impossible to maintain uniformity of the filtering process. The rough surfaces will cause frequent breakage of the winding wires, and frequent rips and tears in the filtering medium, and each time these incidents occur it requires the process to be stopped until the necessary repairs can be made. It becomes necessary to remove the filtering medium, remove the winding wire, and grind down and regroove the winding wire support structures. The stainless steel winding wires also present a safety hazard, as they must be spirally wound onto the drum under tension, and if breakage occurs people in the area may receive injury.

SUMMARY OF THE INVENTION

This invention consists of an improved rotary filter in which the filter support structures are covered with a plastic medium, which has superior corrosion resistance compared to the metal structures previously used. The plastic covers can be installed at the time of manufacture, and thereby prolong the initial life of the filter before replacement of the plastic covers is required. Existing filters can also be refinished in a significantly shorter period of time, by inserting the plastic covers onto the existing support structures, obviating the need for grinding and regrooving. The plastic covers may be prefabricated to the desired size, and specifically to include grooves at the desired spacing and desired depth. The use of the plastic covers enables the use of plastic winding wire, which was heretofore rendered practically infeasible because of the inability of plastic substances to withstand the continuous abrasion against the metallic surfaces of the grooved support structures. In rotary filters in which the support structures are located in sufficiently close proximity, the plastic covers may have a rounded outer surface to receive the filtering medium, thus precluding the necessity of winding wire, while maintaining sufficient cylindrical uniformity of the filtering surface.

BRIEF DESCRIPTION OF THE DRAWINGS

The invention is more particularly described with reference to the specific embodiments depicted in the drawings, in which.

DETAILED DESCRIPTION

Figure 1:
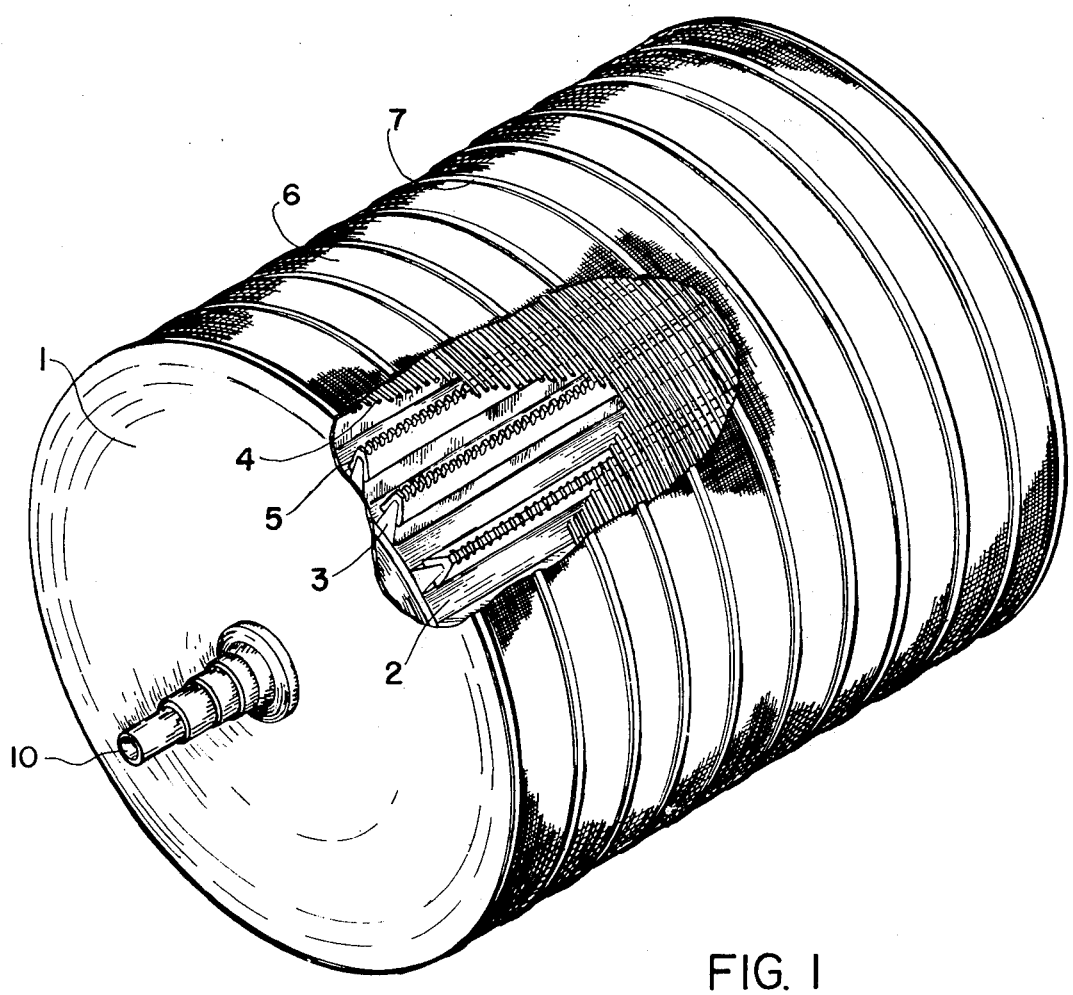
FIG. 1 is a partially cut away isometric view of the rotary filter.

As depicted in FIG. 1, the rotary filter consists of a large drum shaped device, having an inner cylindrical surface 2, which is connected at each end to an end support structure 1. A plurality of support structures 3 are connected at their bottom surface to the cylindrical surface 2, and extend radially outward from the cylindrical surface. These support structures extend longitudinally for the entire length of the filter, and are equally spaced apart at a selective distance. The winding wire 4 is spirally wound around the drum fitting within the notches on the plastic covers 5. The filter medium 6 wraps around the cylindrical surface formed by the winding wire 4. The filter medium 6 is held into place by a plurality of metallic bands 7.

In use, the rotary filter will be rotated continuously in a predetermined direction, and the bottom portion of the filter will extend down into a container of saturated pulp. Suction forces applied within the rotary filter will cause saturated pulp to adhere to the filter medium as it rotates out of the container. The size of the holes in the filtering medium 6 will enable only the fluids to be drawn inward into the drum, and the pulp material will remain adhering to the outer surface. The fluids filtered out of the pulp are pumped out of a pipe 10 out of the drum, normally to a different location within the mill to be recycled. Near the region at which it rotates back into the container, the filtered pulp will be removed from the filter surface.

Figure 2:
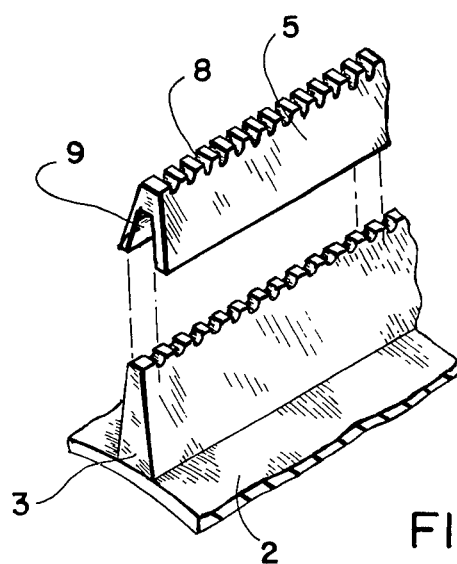
FIG. 2 illustrates the fitting of the plastic cover with selective grooves thereon onto a worn support structure.

FIG. 2 illustrates a part of the inner cylindrical surface 2, having a support structure 3 mounted thereon. The top surface of the support structure 3 illustrates the grooves in the metallic upper surface. The plastic cover 5 fits down onto the support 3, with the inner region 9 of the cover 5 having been made to the predetermined size of the support structure 3, for a close fitting. Once the plastic cover 5 is fitted onto the support structure 3, it may be necessary to drill holes and fit metal pins which extend through both sides of the cover 5 and the support structure 3, to hold the cover 5 in place. A series of notches 8 are cut into the upper surface of the cover 5, and are adapted to receive a winding wire of a predetermined size in diameter. The winding wire, filter medium and bands will hold the plastic cover in place when completed.

Figure 3:
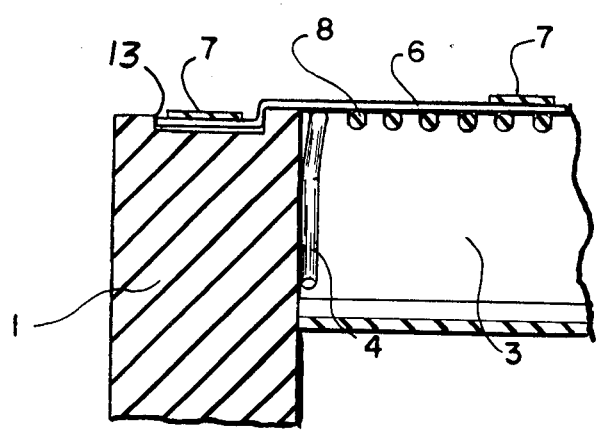
FIG. 3 is a partial section view of an end portion of the rotary filter shown in FIG. 1.

FIG. 3 is a partial section view of the end region of the rotary filter of FIG. 1. The support structure 3 abuts against the end support 1. The support structure 3 has a plurality of notches 8 cut therein, and the winding wire 4 is anchored to the end member 1, and is thence spirally wound around the cylinder, extending through each of the notches 8. The filter medium 6 is then fitted onto the surface formed by the winding wires, with the ends thereof being fitted into a depression 13 around the outer circumference of the end member 1. Bands 7 extend around the end members 1 and at various locations around the cylinder to hold the filter medium 6 into place.

The invention as illustrated in FIG. 1 has several advantages over prior art structures. The plastic cover 5 has superior corrosion resistance qualities compared to the metallic surfaces heretofore comprising the filter support structures, and will last longer before requiring replacement, and will extend the useful life of the filter. The use of the plastic covers 5 will also enable the use of plastic winding wire 4, which will have longer corrosion life than the stainless steel wire heretofore used. The metal to metal surface juncture of the support structures and winding wire would entrap particulate corrosive contaminants, and would also cause corrosion by abrasion. The plastic to plastic surface will reduce the amount of abrasion between these surfaces and particulate contaminants will not adhere to the plastic as it would to metal. The plastic surfaces will also improve performance of the filter since the plastic surface offers less resistance to fluid flow. Furthermore, if winding wires are to be used, the grooves in the plastic cover may be spaced farther apart than they existed on the metal support, thereby increasing the effective filtering surface area and increasing the rate of the filtration process.

When it becomes necessary to replace the plastic covers 5, or in the first instance to refinish an existing rotary filter having metallic supports 3, initially the bands 7 are removed, enabling the removal of the filter medium 6. Then the winding wire 4 is removed, exposing the support structures. If the rotary filter is not already equipped with the plastic covers 5, they may simply be inserted onto the existing metal supports 3, and if already equipped, the existing covers are readily removed and new ones placed onto the support structures. When the plastic covers are all in place, if winding wire is to be used, the winding wire is then spirally wound around the cylinder extending through the notches. Then the filter medium 6 is placed around the drum and secured into place by means of bands 7. This process can be completed in one-tenth or less of the time previously required to rework the filter by regrinding metallic support structures, and grinding new grooves therein.

Figure 4:
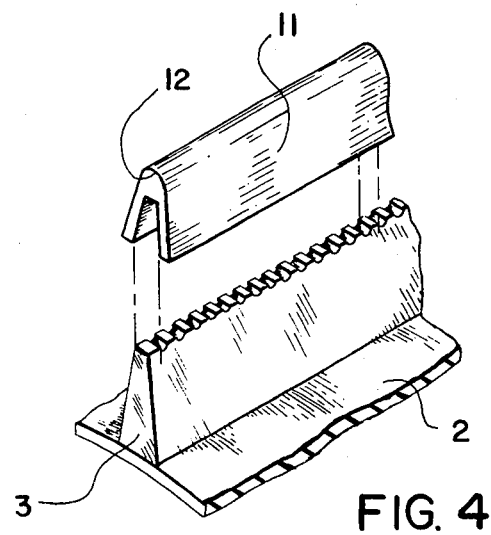
FIG. 4 illustrates the fitting of a plastic cover without grooves onto the support structure.
Figure 5:
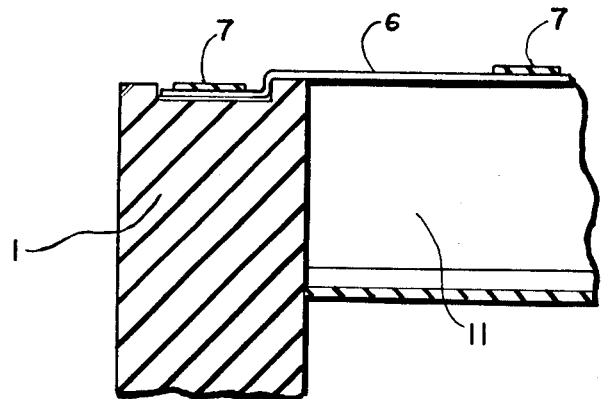
FIG. 5 is a partial section view of an end portion of the rotary filter of FIG. 1 having fitted thereon the plastic cover of FIG. 4.

As illustrated in FIGS. 4 and 5, the present invention also renders it feasible to entirely avoid the use of the winding wire. In this instance, the plastic covers 11 are fitted directly onto the support structures 3 in the same manner. The upper surface 12 of the cover 11 is slightly rounded, to conform to the outer circumference formed by placement of the filter medium around the cylinder onto the support structures. The filter medium 6 rests directly on the support structures 11, and is held in place by the bands 7. Heretofore it has not been feasible to place the filter medium, of either plastic or metallic composition, directly on to the support structures.

The term plastic as used herein is intended to be a generic term including all synthetic monofilaments, such as polyethylene, polypropylene, kynar, etc. Polyethylene, particularly ultra high molecular weight polyethylene, is highly resistant to abrasion and is economical, but is not highly chemical resistant and should be used in esssentially neutral environments. It is the most desirable of the available plastics when the pH of the filtered liquids permits its usage. In applications which do not involve significant exposure to abrasion, kynar is the preferred substance, as it is chemically practically inert, and is particularly resistant to acidic solutions. Kynar is particularly adaptable to the rotary filter of this invention because of the reduced exposure to abrasion. Polypropylene has good resistance to both abrasion and chemical corrosion, but the degree of heat to which it can be exposed limits its applications. All of the above and similar substances may be used for the composition of the filtering medium, winding wire (if used) and covers for the support structures, with selection determined in each instance by the characteristics of the particular usage environment.

What is claimed is:
1. In a rotary filter, the combination of:
 a. An inner cylindrical surface;
 b. A plurality of support structures selectively spaced apart and extending longitudinally along said surface;
 c. Plastic coverings fitted over said support structures;

d. A filter medium extending around the outer circumference formed by said support structures and resting against said support structures; and, e. Means for holding said filter medium firmly against said support structures.

2. The rotary filter of claim 1 wherein said filter medium is composed of a plastic substance.

3. The rotary filter of claim 1 wherein said plastic coverings have selectively sized and spaced grooves in their outer surface, and further including wire spirally wound around the filter fitting within said grooves.

4. The rotary filter of claim 3 wherein said wire is composed of a plastic substance.

5. The rotary filter of claim 3 wherein said filter medium is composed of a plastic substance.

6. The rotary filter of claim 4 wherein said filter medium is composed of a plastic substance.

7. A method of refinishing a rotary filter of the type consisting of a plurality of metallic support structures selectively located on an inner cylindrical surface, wire spirally wound around the filter and fitting within grooves in said support structures, and a filter medium extending around the outer circumference formed by said wire, consisting of the following steps:

a. Removing the filter medium to expose the wire wound around the filter;

b. Removing the wire wound around the filter to expose the support structures;

c. Placing a plastic cover of predetermined size over each of said support structures;

d. Placing a new filter medium around said rotary filter and resting on said plastic covers; and, e. Securing the filter medium against said support structures.

8. The method of claim 7 wherein the new filter medium is composed of a plastic substance.

9. The method of claim 7 wherein said plastic covers have selectively sized and located grooves therein, and further consisting of the step of spirally winding wire around said filter and fitting within said grooves, before placing and securing said new filter medium.

10. The method of claim 9 wherein said wire is composed of a plastic substance.

11. The method of claim 9 wherein said new filter medium is composed of a plastic substance.

12. The method of claim 10 wherein said new filter medium is composed of a plastic substance.

* * * * *